Nov. 16, 1937.    H. PAXTON    2,099,225
CLEAN-OUT
Filed May 31, 1935
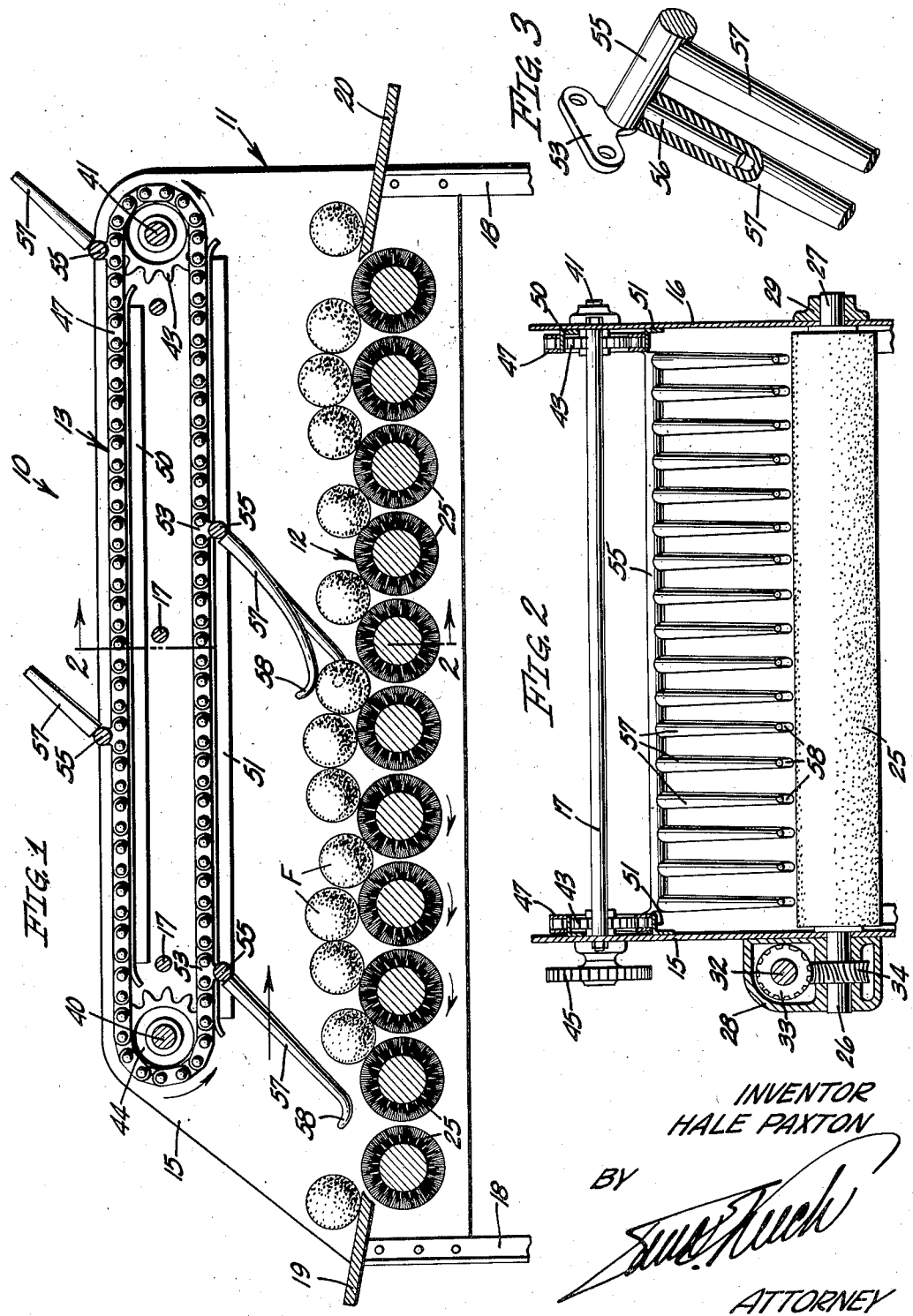
INVENTOR
HALE PAXTON
BY
ATTORNEY Patented Nov. 16, 1937

2,099,225

UNITED STATES PATENT OFFICE 2,099,225

CLEAN-OUT

Hale Paxton, Santa Ana, Calif., assignor, by mesne assignments, to Food Machinery Corporation, a corporation of Delaware Application May 31, 1935, Serial No. 24,186

3 Claims. (Cl. 146—202)

My invention relates to machines for use in preparing agricultural produce for market and has particular reference to a novel clean out mechanism for use in machines for washing or otherwise treating citrus fruits and the like.

In the citrus industry it is necessary to thoroughly wash the fruit to remove the dirt, scale and other surface inpurities therefrom. This is usually done by first soaking the fruit and then passing the fruit through a brushing machine. The fruit brusher most commonly used in the citrus packing houses consists of a frame in which a plurality of transverse, rotary brushes are juxtaposed, this machine being known as the transverse brusher. The fruit is fed onto the upper surfaces and subjected to the scrubbing action of the rapidly rotating brushes. The fruit tends to remain in the valleys between the brushes until being crowded into the next adjacent valley by oncoming fruit. After a given lot of fruit is brushed, a certain amount of residual fruit remains in the valleys between the brusher in the brushes, it being necessary to remove or clean out this residual fruit before washing another lot, in order to keep the different lots of fruit separated.

It is very necessary that fruits being prepared for shipment be handled carefully as any injury thereto causes the fruit to spoil within a short time. Therefore, any mechanism employed in a fruit brusher for cleaning out residual fruit must handle the fruit very gently and yet effectively enough to accomplish the cleaning out operation.

Accordingly, an object of my invention is to provide an efficient clean out for a fruit brusher that is extremely gentle in operation.

Another object of my invention is the provision of a clean out that will permit fruit to travel through the brusher at a speed in excess of that at which the clean out travels in case the rate at which fruit is fed to the machine increases to the point where this is necessary.

A further object of my invention is to provide such a clean out mechanism in which the fruit impelling means thereof is readily removable or replaceable.

Other objects and advantages will be made manifest in the following description taken in view of the accompanying drawing, in which:

Fig. 1 is a longitudinal, vertical sectional view of a preferred embodiment of my invention.

Fig. 2 is a vertical sectional view taken on the line 2—2 of Fig. 1.

Fig. 3 is a fragmentary, detailed, perspective view of a portion of the clean out mechanism shown in Figs. 1 and 2.

Referring specifically to the drawing, a fruit brusher 10, comprising a preferred embodiment of my invention is shown in Fig. 1, this brusher including a frame 11, a brushing unit 12 and a clean out mechanism 13.

The frame 11 includes side plates 15 and 16, these being spaced by tie bars 17 and supported from the floor by suitable legs 18. Provided at the inlet and outlet ends of the brusher 10 are drop boards 19 and 20 respectively.

The brushing unit 12 includes a plurality of transverse, rotary brushes 25 having trunnions 26 and 27 on opposite ends thereof. The trunnions 26 are rotatably received by a housing 28 on the plate 15, the trunnions 27 being journalled in bearings 29 fixed on the plate 16. Extending through the housing 28 is a shaft 32 driven from any suitable source of power. The brushes 25 are driven from the shaft 32 by means of suitable spiral gears 33 and 34 on the shaft 32 and trunnions 26 respectively.

The clean out mechanism 13 includes a pair of shafts 40 and 41, rotatably mounted in suitable bearings on the plates 15 and 16. Fixed on the shaft 41 adjacent the plates 15 and 16 are sprockets 43, as shown in Fig. 2, a drive sprocket 45 being fixed on one end of the shaft 41. Mounted on the shaft 40 in alignment with the sprockets 43 are similar sprockets 44. Trained about the sprockets 43 and 44 are endless chains 47. The upper flights of the chains 47 ride on angle iron bars 50 provided on the plates 15 and 16, similar bars 51 being provided for supporting the lower flights of the chains 47. Fixed at their ends to links 53 of the chains 47 are transverse bars 55, each of the latter having studs 56 fixed thereto as seen in Fig. 3. Forced onto the studs 56 are downward extending, yieldable fingers 57 having upturned ends 58 as shown.

Operation

While the brusher 10 is adapted for a variety of uses, its operation will now be described when used as a fresh fruit washer.

Fruit F, which was previously soaked in a suitable tank (not shown), is fed onto the drop board 19 of the brusher 10 as shown in Fig. 1. The fruit tends to remain in the valleys between the brushes 25 until being crowded into the next adjacent valley by incoming fruit.

While the brushes 25 are being driven in the direction indicated by the arrows of Fig. 1, the shaft 41 of the clean out mechanism 13 is driven by any suitable power means connected to the sprocket 45. Rotation of the shaft 41 causes the chains 47 to be driven in the direction indicated by the arrows of Fig. 1. The chains 47 carry the fingers 57 over the brushing unit 12, the lower ends 58 of the fingers 57 contacting the pieces of fruit F and urging the latter through the brusher 10.

If the fruit F should tend to crowd through the brusher 10 at a rate of speed greater than the rate of travel of the fingers 57, the fruit forces the fingers upward and passes thereunder as shown in Fig. 1. This is possible due to the rotation of the fruit in a counterclockwise direction by the brushes 25.

After a given lot of fruit is washed, the residual fruit is promptly cleaned out of the brusher 10 by the fingers 57.

In the event that any of the fingers 57 becomes worn or deformed, it can be easily and quickly removed from its stud 56 and a new finger 57 forced thereon, this operation being performed while the fingers 57 are disposed above the upper flights of the chains 47.

Although I have shown but one preferred form of my invention, it is understood that various modifications and changes might be made therein without departing from the spirit of the invention or the scope of the appended claims.

I claim as my invention:

1. In a fruit brushing machine, the combination of: a frame; a plurality of juxtaposed, cylindrical brushes journalled transversely on said frame, the uppermost sides of said brushes forming a fruit brushing surface, said surface being characterized by fruit receiving valleys, one of which is disposed between each adjacent pair of said brushes; means for rotating said brushes in a common direction; overhead travelling clean out carrier means; a clean out carried by said carrier means over said fruit brushing surface, said clean out including a plurality of relatively long resilient fingers extending downwardly and rearwardly at a substantial angle with the horizontal to a point close above said brushing surface, the lower ends of said fingers being formed of soft material and being turned upwardly so that when said finger ends are engaged by fruit traveling over said brushing surface at a rate in excess of the speed of said carrier means a rolling contact is established between said fruit and said finger ends which lifts said finger ends upwardly and rearwardly and permits said fruit to rotate forwardly between said brushing surface and said fingers.

2. In a fruit brushing machine, the combination of: a frame; a plurality of juxtaposed, cylindrical brushes journalled transversely on said frame, the uppermost sides of said brushes forming a fruit brushing surface, said surface being characterized by fruit receiving valleys, one of which is disposed between each adjacent pair of said brushes; means for rotating said brushes in a common direction; overhead travelling clean out carrier means; a clean out carried by said carrier means over said fruit brushing surface, said clean out including a plurality of relatively long resilient fingers extending downwardly and rearwardly at an angle of substantially forty-five degrees with the horizontal to a point close above said brushing surface, the lower ends of said fingers being turned upwardly so that when said finger ends are engaged by fruit traveling over said brushing surface at a rate in excess of the speed of said carrier means a rolling contact is established between said fruit and said finger ends which lifts said finger ends upwardly and rearwardly and permits said fruit to rotate forwardly between said brushing surface and said fingers.

3. In combination with a fruit treating machine of the type employing a series of treating rolls arranged transversely to the flow of fruit thereover and rotated rapidly upon fixed axes in adjacent parallel relation to form fruit supporting valleys therebetween: a clean out mechanism comprising a travelling carrier having a fruit impeller depending therefrom to engage with and advance fruit from valley to valley across the rolls in the direction travelled by upper portions of said rolls, said impeller being inclined rearwardly downward with respect to its direction of travel, being yieldable to permit its lower portion to move upwardly and rearwardly and having its lower end curved rearwardly upward for engagement by fruit advancing over the rolls at a faster rate than the impeller to enable said fruit to lift said impeller upwardly and rearwardly and pass thereunder.

HALE PAXTON.